United States Patent
Navalekar et al.

(10) Patent No.: US 10,044,490 B2
(45) Date of Patent: Aug. 7, 2018

(54) ADJACENT CHANNEL INTERFERENCE CANCELLATION IN MULTI-CHANNEL SYSTEMS

(71) Applicant: Parallel Wireless, Inc.

(72) Inventors: Abhijit Navalekar, Westford, MA (US); Rajesh Kumar Mishra, Westford, MA (US); Sumit Garg, Hudson, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/542,544

(22) Filed: Nov. 14, 2014

(65) Prior Publication Data

US 2015/0131493 A1    May 14, 2015

Related U.S. Application Data

(60) Provisional application No. 61/904,280, filed on Nov. 14, 2013.

(51) Int. Cl.
*H04L 5/14* (2006.01)
*H04L 12/701* (2013.01)
*H04L 12/70* (2013.01)

(52) U.S. Cl.
CPC ..................................... *H04L 5/14* (2013.01)

(58) Field of Classification Search
CPC combination set(s) only.
See application file for complete search history.

(56) References Cited

U.S. PATENT DOCUMENTS

| | | | |
|---|---|---|---|
| 5,742,591 A * | 4/1998 | Himayat | H04N 7/17309 348/E7.052 |
| 7,058,040 B2 | 6/2006 | Schmidt | |
| 7,136,361 B2 | 11/2006 | Benveniste | |
| 7,633,901 B2 | 12/2009 | Yuen et al. | |
| 7,636,550 B2 | 12/2009 | Yuen et al. | |
| 7,949,376 B2 | 5/2011 | Maekawa | |
| 8,886,240 B2 | 11/2014 | Lancaster et al. | |
| 8,908,595 B2 | 12/2014 | Palanki et al. | |
| 2003/0207669 A1 | 11/2003 | Kroeger | |
| 2008/0085720 A1 | 4/2008 | Hirano et al. | |
| 2008/0108318 A1 | 5/2008 | Min et al. | |
| 2008/0181192 A1 | 7/2008 | Nabetani et al. | |
| 2009/0163238 A1 | 6/2009 | Rao et al. | |
| 2010/0177712 A1 | 7/2010 | Kneckt et al. | |

(Continued)

FOREIGN PATENT DOCUMENTS

WO    WO-03090037 A2    11/2005

*Primary Examiner* — Yee Lam
(74) *Attorney, Agent, or Firm* — Michael Saji

(57) ABSTRACT

A method for adjacent channel interference cancellation may be disclosed, comprising collecting adjacent channel usage samples at a first time; assigning coefficient weights in an adjacent channel interference model based on the adjacent channel usage samples; determining whether a radio may be available for measuring current adjacent channel usage; adjusting coefficient weights based on the current adjacent channel usage; and canceling noise in an adjacent channel at a second time based on the coefficient weights. A radio frequency chain may be coupled to the output of the radio transceiver and configured to sample adjacent channel interference caused by the radio transceiver.

19 Claims, 6 Drawing Sheets

(56) References Cited

U.S. PATENT DOCUMENTS

| | | |
|---|---|---|
| 2010/0267407 A1 | 10/2010 | Liao et al. |
| 2011/0006824 A1 | 1/2011 | Kang et al. |
| 2011/0075774 A1 | 3/2011 | Hiben et al. |
| 2011/0305306 A1* | 12/2011 | Hu .................... H03H 21/0021 375/350 |
| 2012/0177095 A1 | 7/2012 | Haran et al. |
| 2013/0102254 A1* | 4/2013 | Cyzs .................... H04B 1/126 455/63.1 |
| 2013/0201918 A1 | 8/2013 | Hirakawa et al. |
| 2013/0250836 A1 | 9/2013 | Shiotani |
| 2014/0086120 A1 | 3/2014 | Mishra et al. |
| 2014/0092765 A1 | 4/2014 | Agarwal et al. |
| 2014/0133456 A1 | 5/2014 | Donepudi et al. |
| 2014/0233412 A1 | 10/2014 | Mishra et al. |
| 2015/0045063 A1 | 2/2015 | Mishra et al. |
| 2015/0063214 A1 | 3/2015 | Mishra et al. |
| 2015/0098385 A1 | 4/2015 | Navalekar et al. |
| 2015/0098387 A1 | 4/2015 | Garg et al. |

\* cited by examiner

ADJACENT CHANNEL INTERFERENCE CANCELLATION IN MULTI-CHANNEL SYSTEMS

CROSS-REFERENCE TO RELATED APPLICATIONS

This application claims the benefit of priority under 35 U.S.C. § 119(e) of U.S. Provisional Patent Application No. 61/904,280, filed Nov. 14, 2013, and entitled "Methods for Adjacent Channel Interference (ACI) Cancellation in Multi-Radio/Multi-Channel Systems," which is hereby incorporated by reference in its entirety for all purposes. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; and U.S. patent application Ser. No. 14/211,355, entitled "Methods of Incorporating an Ad Hoc Cellular Network into a Fixed Cellular Network," filed Feb. 18, 2014.

BACKGROUND

Receiving radio frequency transmissions involves managing noise. One approach is to cancel the noise at the receiver, by identifying sources of input noise and subtracting the input noise from the received signal. Another approach is to use non-overlapping channels, divided by frequency, to send and receive data without interfering with neighboring channels. However, for any given signal that is transmitted in a particular frequency channel, it is difficult to completely mask out unwanted transmissions in adjacent channels.

SUMMARY

A method for adjacent channel interference cancellation may be disclosed, comprising collecting adjacent channel usage samples at a first time; assigning coefficient weights in an adjacent channel interference model based on the adjacent channel usage samples; determining whether a radio may be available for measuring current adjacent channel usage; adjusting coefficient weights based on the current adjacent channel usage; and canceling noise in an adjacent channel at a second time based on the coefficient weights.

Canceling noise may be performed in the digital domain and in the analog domain. The first time may be more than 5 milliseconds prior to the second time. Determining whether the radio may be available for measuring current adjacent channel usage based on an unused time slot in a time division duplexing scheme may be performed.

A radio transceiver system may also be disclosed, comprising a memory configured to store instructions; a radio transceiver, the radio transceiver being configurable for receiving radio transmissions on a plurality of frequencies and to obtain a sample of an adjacent channel interference signal; and a processor coupled to the memory, the radio transceiver and the radio frequency chain configured to compute an adjacent channel interference cancellation signal based on the adjacent channel interference signal sample.

A radio frequency chain may be coupled to the output of the radio transceiver and configured to sample adjacent channel interference caused by the radio transceiver. The radio frequency chain may be configured to perform noise cancellation in the analog domain. A storage module may be provided for storing adjacent channel samples, and the processor may be further configured to precompute a plurality of coefficients for multiplying the adjacent channel interference cancellation signal based on the stored adjacent channel samples. The radio transceiver may be a software-defined radio. A second radio transceiver may also be included.

A system for adjacent channel interference cancellation may also be disclosed, comprising: a multi-radio access technology (RAT) base station, the base station further comprising: a memory configured to store instructions, a radio transceiver, the radio transceiver being configurable for receiving radio transmissions on a plurality of frequencies and to obtain a sample of an adjacent channel interference signal, and a processor coupled to the memory, the radio transceiver and the radio frequency chain configured to compute an adjacent channel interference cancellation signal based on the sample of the adjacent channel interference signal; and a coordination server, the coordination server further comprising: an interference cancellation module configured to receive the sample of the adjacent channel interference signal, and configured to determine coefficient weights in an adjacent channel interference signal.

The interference cancellation module may be configured to use a neural network to determine the coefficient weights. The interference cancellation module may be configured to use samples from more than one multi-RAT base station to determine coefficient weights. The multi-RAT base station may be configured to receive the determined coefficient weights from the coordination server and may be configured to apply an adjacent channel interference cancellation signal based on the determined coefficient weights.

DETAILED DESCRIPTION

Interference Cancellation

Using multiple radios increases the capacity of the network by using non-overlapping channels for transmitting data. However due to limited isolation in the frequency domain between adjacent transmissions, even after the use of non-overlapping channels there is some amount of residual interference commonly referred to as Adjacent Channel Interference (ACI). Interference degrades performance. It is therefore desirable to mitigate ACI.

The actual amount of interference depends on the transmit mask requirements specified in the standard. This is because implementation of a transmitter that complies with the required emission and falloff requirements requires merely the selection and use of an appropriate radio frequency (RF) filter, but effective filters may be more costly than less-effective filters, and consequently, manufacturers may select filters that comply with but do not exceed emissions requirements. This is also a concern with unlicensed spectrum, as other emitters, such as microwave ovens, may emit interference over adjacent channels. "Adjacent," as used herein, refers to frequency bands located immediately on either side of a target frequency band.

The inventors have appreciated new methods for providing increased isolation between adjacent channels. The methods are applicable not only to non-overlapping channels but also to overlapping channels.

Figure 1:
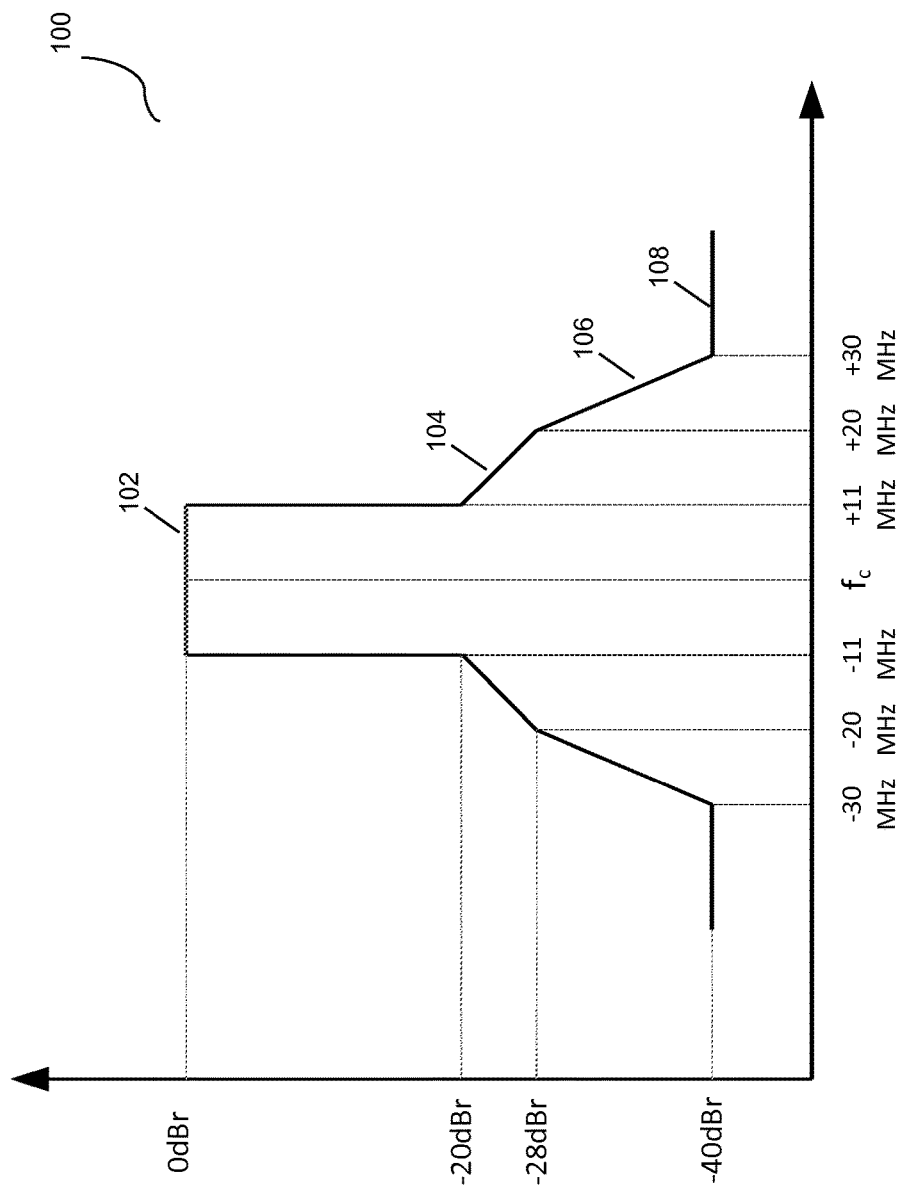
FIG. 1 is a frequency emission diagram showing falloff of a signal transmitted within a particular channel.

FIG. 1 is a frequency emission diagram showing falloff 100 of a signal transmitted within a particular channel. A frequency emission diagram reflecting a transmit mask for a 22 MHz bandwidth channel for IEEE 802.11a/g Wi-Fi is shown. The particular frequency emission diagram reflects a transmission that complies with the transmit mask specified in the Wi-Fi specification for a 22 MHz channel centered around a target channel frequency, $f_c$. As expected, power output 102 is highest around the target channel frequency, $f_c$, at 0 dBr.

However, power output outside the target channel frequency remains high. In the adjacent channels 104, +11 MHz from the target channel frequency, a power level of between −20 and −28 dBr is emitted. In the channel adjacent to channel 104, at +22 MHz, a power level of between −28 and −40 dBr is emitted. In the channel adjacent to channel 106, a power level of −40 dBr is emitted. Typically, a symmetric emission pattern occurs in adjacent channels below the target frequency, e.g., at −11 MHz, −20 MHz, and −30 MHz. Assuming a typical noise floor in the 2.4 GHz Wi-Fi spectrum range, which may be approximately −95 dBm, the −40 dBr interference signal received by a receiver for the frequency channel $f_{c\pm30 \, MHz}$ is significantly above the noise floor.

Figure 2:
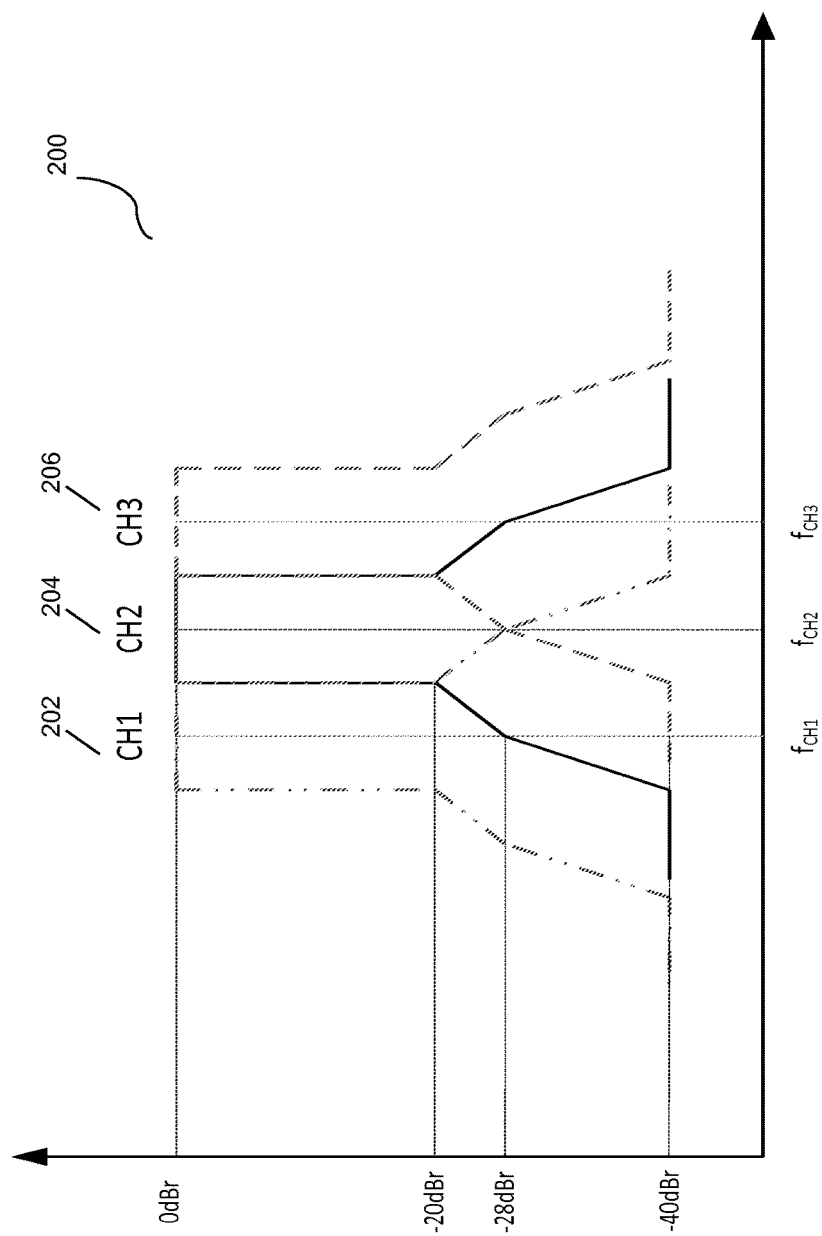
FIG. 2 is a frequency emission diagram showing falloff of signals transmitted within adjacent channels.

FIG. 2 is a frequency emission diagram showing falloff 200 of signals transmitted within adjacent, non-overlapping channels using a standard channel mask as specified by IEEE 802.11a/g. Three waveforms 202, 204, 206 are designated CH1, CH2, and CH3, and each waveform is centered on a target frequency $f_{CH1}$, $f_{CH2}$, $f_{CH3}$. Channel CH1 adjoins channel CH2, which adjoins channel CH3. The falloff waveform for each channel is the same waveform, and is also the same waveform 100 shown in FIG. 1. Visible in FIG. 2 is the interference signal that each adjoining channel creates in its adjacent channels. Also visible is the cumulative effect of both CH1 and CH3 on CH2. Thus, significant degradation of the performance of radios using non-overlapping channels, such as three radios separately using CH1, CH2, and CH3, will result due to the increase of the noise floor caused by transmissions on adjacent channels. In FIG. 2, the noise floor for CH2 may be increased by 40 dBr, a significant degradation.

Initial Modeling

Further description of various embodiments of the invention follows.

In some embodiments, modeling of the interference pattern of one or more adjacent channels as a non-linear function $f(x)$ may be performed. In some embodiments, the function $$f(x)=b_n x^n + b_{n-1} x^{n-1} + \ldots + b_0$$

could be used to model the interference pattern, where the non-linear function $f(x)$ is an amount of energy in the one or more adjacent channels.

The weights $b_n$ are dynamically updated based on sampled feedback from the interference estimation module on one or more adjacent channels, using statistical techniques like least squares deviation, partial least squares regression, hierarchical clustering, and/or minimum mean square error to reduce sampling error and to fit the error points to a polynomial curve. Sampling may be performed at the transceiver. Sampling may be performed at regular intervals, or immediately prior to a transmit or receive operation, or prior to a transmit/receive but not immediately prior. Sampling may be performed in one channel adjacent to the target frequency, two adjacent channels, channels adjacent to the channels adjacent to the target frequency, channels adjacent to channels adjacent to the target frequency, or other channels.

Using a low-latency connection to a remote cloud coordination server, the samples may be transmitted from the transceiver to the remote server and analyzed remotely, in some embodiments. In some embodiments, full samples may be transmitted. In some embodiments, the samples may be compressed or specific features of the samples may be extracted before transmission to the remote coordination server.

In some embodiments, the cancellation algorithm can be triggered by the cloud coordination server, which may be located in the network at a central location with reference to multiple backhaul links for a plurality of transceiver stations. In this embodiment, one criterion that the cloud coordination server may use when determining whether to initiate the cancellation algorithm may be whether radios using adjacent channels are in opposite transceiver modes (i.e one is transmitting while other is receiving). In this instance, the cancellation algorithm would be used. This determination could be made in software, hardware or firmware. For example, one embodiment could be a field programmable gate array (FPGA) logic implementation such as A'B+B'A.

Sampling

In some embodiments, real-time sampling of out-of-band emissions and/or interference may be used to cancel adjacent channel interference. In one embodiment, sampling and/or cancellation of the out-of-band interference is first carried out in analog domain by using either a complete RF chain or parts of the chain, e.g., one or more DACs, mixers, or attenuators. This is followed by cancellation of any residual interference in the digital domain. In alternate embodiments, the cancellation of out of band interference could include more iterations of the cancellation algorithm in the analog or digital domains. The order of these calculations could vary or could be strictly digital or strictly analog.

In some embodiments, additional data could be collected and the model updated using the same algorithm or a different algorithm. In some embodiments, the model could be updated in real time. In some embodiments, the model could be updated offline and/or at a remote server. In some embodiments, the remote server may use specific information about known interference sources to update the model. In some embodiments, the information about known interference sources may be received from a central server and used at the transceiver. In some embodiments, information about past interference, either at the transceiver or at the central server, may be used to produce seed values for the sample-fitting algorithm.

In some embodiments, sampling may require that one or more radios be added to the transceiver for sampling interference at the same time as performing routine transmission and reception (i.e., out of band from the data channel), with the addition of corresponding baseband processing resources for processing data received at the one or more radios. In some embodiments, the same radios used for in-band transmission and reception may be used. In the case that the same radios are used, coordination may be used to manage radio usage, in order to prevent interference sampling from interfering with the transmission and/or reception of in-band data.

In some embodiments, when coordination for managing radio usage is used, the radios may be reserved for use by the transmitter when data exists to be transmitted. Further, the radios may be reserved for use by the receiver for at least a fraction of the total available time. A configurable threshold for this radio usage ratio may be configured either at the transceiver device or at the cloud coordination server. A target number of radio samples may be configured either at the transceiver device or at the cloud coordination server.

In some embodiments, when coordination for managing radio usage is used in conjunction with a time division duplexing method, the usage or duty cycle for the radio cycle may be known at least a short time in advance. All unused cycles for the radio may be used for adjacent channel sniffing, or some cycles may be reserved as headroom for meeting unanticipated demand.

In some embodiments, a self-interference cancellation technique may also be performed in a multi-channel radio, wherein adjacent channels are transmitted via a single transmitting device in coordination with each other.

In an embodiment used for two or more channels of data transmitted with a non-simultaneous access protocol, frame boundaries may be staggered between two adjacent radios to perform adjacent channel interference cancellation. Staggering can be accomplished by aligning the symbol boundaries across different radios. i.e. if a first radio is configured to start at time 0, a second radio is configured to start at time 0.1. In some embodiments, frame staggering can be coordinated by the central cloud server. This embodiment addresses the fact that some technologies, such as Wi-Fi, do not transmit cell-specific training signals. All cells in Wi-Fi typically transmit the same pilots/preambles, which are sent at the beginning of a physical layer packet, irrespective of who is transmitting them. Frame staggering facilitates coordination of transmissions of signals between neighbors, by permitting estimation of ACI coming from at least one neighboring signal.

The use of frame staggering, therefore, may allow for correct estimation of the out-of-band interference using preamble sequences. In addition to processing techniques at the baseband/RF frontend, we can in alternate embodiments use antenna polarization and directionality to reduce coupling between neighboring antennas thereby providing additional isolation. For example, the radios using adjacent channels can use orthogonal linear polarizations or orthogonally polarized circular antennas. In some embodiments, these radios could use directionality.

A frame staggering technique may be used in conjunction with unique pilots/preambles, in some embodiments. A frame staggering technique may be used in conjunction with a time division duplexing method, a frequency division duplexing method (wherein frame staggering is applied to the start time of frames), or any other duplexing method or technique.

Implementation

In some embodiments, the implementation could be purely analog, purely digital, or a combination of the two. The choice between analog and digital is a function of how much mitigation is needed as compared with how much mitigation can be expected from the analog or the digital technique.

Figure 3:
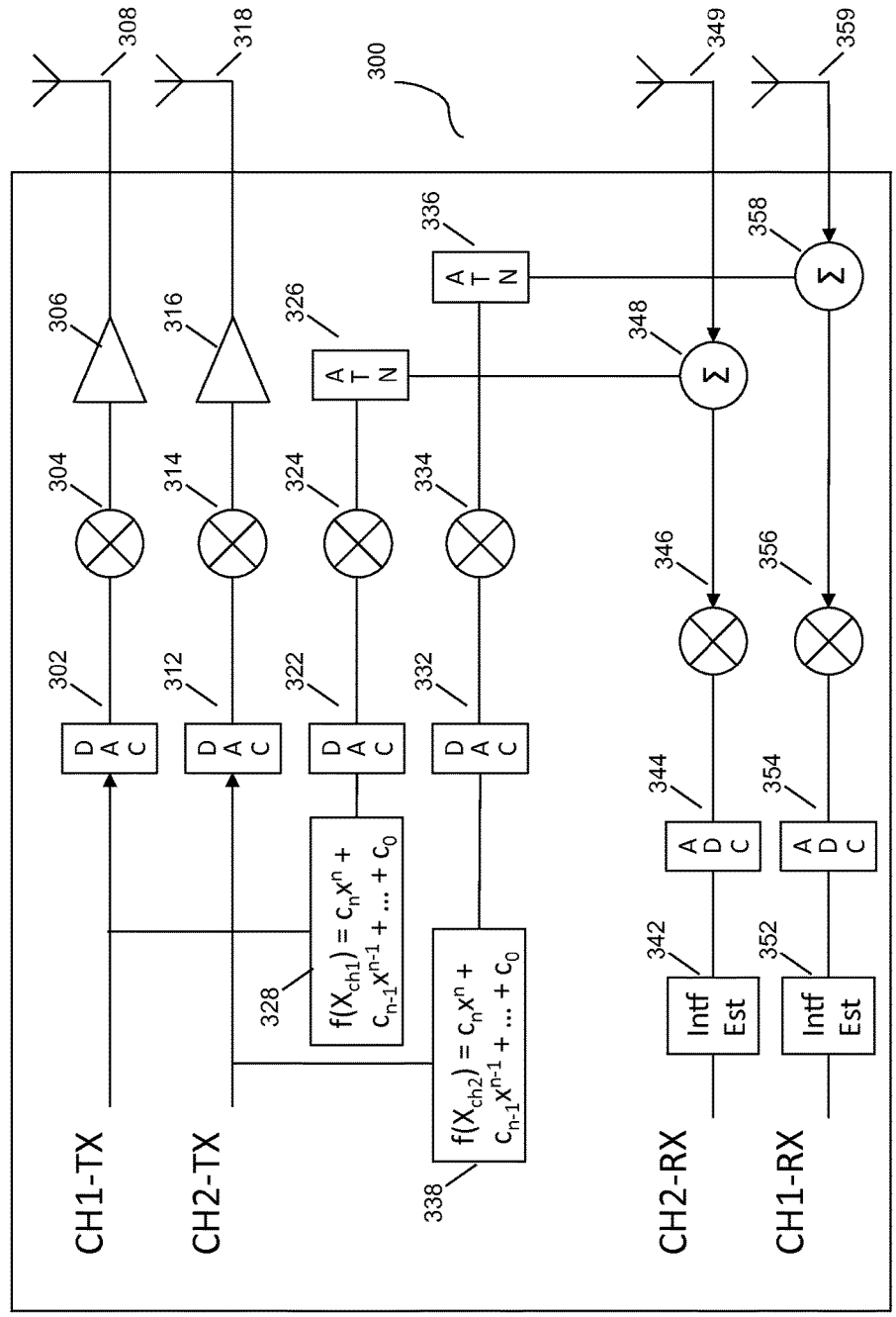
FIG. 3 is a schematic diagram depicting an apparatus for canceling adjacent channel interference, in accordance with some embodiments.

FIG. 3 is a schematic diagram depicting an apparatus for canceling adjacent channel interference, in accordance with some embodiments. Device 300 is a base station with two channel transmission, CH1-TX and CH2-TX, and CH1-RX and CH2-RX.

On CH1-TX, an initially-generated signal is coupled both to digital-analog converter (DAC) 302 and CH1-TX adjacent channel interference (ACI) cancellation module 328. DAC 302 is coupled to mixer 30, for raising the signal from baseband to the transmission frequency, and to amplifier 306, and then to antenna 308, constituting the transmit path for channel CH1.

ACI module 328 models the input signal according to the formula $$f(X_{ch1}) = c_n x^n + c_{n-1} x^{n-1} + \ldots + c_0,$$

and outputs an interference cancellation signal to DAC 322, then to mixer 324 for upconversion to the transmission frequency, then to attenuator (ATN) 326, which is coupled to adder 348 in the receive path for channel CH2. The upconversion is performed in order to allow interference to be cancelled at the receive channel prior to downconversion of the received signal.

On CH2-TX, as with CH1-TX, an initially-generated signal is coupled to DAC 312, which is coupled to the transmit path for channel CH2, and ACI module 338. The transmit path for channel CH2 is mixer 314, amplifier 316, and antenna 318. ACI module 338 has the same formula as ACI module 328 for modeling the adjacent channel noise, but receives the input from CH2-TX instead of CH1-TX. ACI module 338 is coupled to DAC 332, then to mixer 334, then to ATN 336, which is coupled to adder 358 in the receive path for channel CH1.

On CH2-RX, signals are received at antenna 349, then added at adder 348 to the interference cancellation signal from CH1-TX. This performs interference cancellation in the analog domain. The signal then is sent to mixer 346, which brings the signal from its transmission frequency down to baseband, and then to analog to digital converter (ADC) 344, where it is digitized. The digitized signal is then passed through interference estimator 342, where any additional digital interference cancellation may be performed.

On CH1-RX, similarly, signals are received at antenna 359, added to the analog interference cancellation signal from ATN 336/CH2-TX at adder 358, subject to frequency downconversion at mixer 356, digitized at ADC 354, and then subject to any additional interference estimation and cancellation at module 352.

Figure 4:
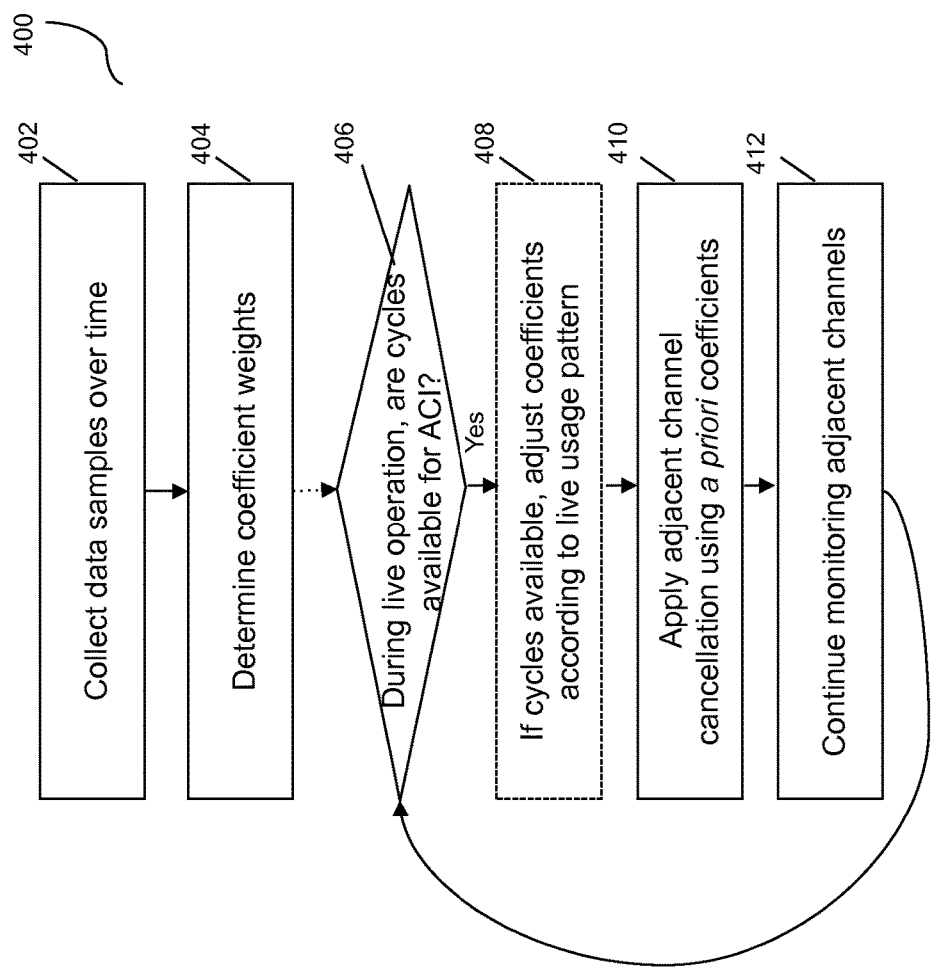
FIG. 4 is a flowchart depicting a method for canceling adjacent channel interference, in accordance with some embodiments.

FIG. 4 is a flowchart depicting a method 400 for canceling adjacent channel interference, in accordance with some embodiments. At step 402, operation begins. Samples are collected over time, typically at a first radio transceiver. Samples may be directed to a cloud server, or to a module co-located with the first radio transceiver, in some embodiments.

At step 404, based on the output of step 402, a model may be used to fit the received samples to a polynomial, and various coefficients for the different terms of the polynomial may be identified. The coefficients may be stored. The coefficients may be sent from a central server to the transceiver or base station, and operation may continue at a later time. At step 406, during live operation, adjacent channel interference may be caused to be canceled. Step 406 may be initiated by a cloud server, or directly by the transceiver or base station, in some embodiments. Using one or more of the methods described herein, at step 406, it is determined whether radio and processor duty cycles permit the use of both radio, central, and baseband processor resources for obtaining samples and/or performing computation of adjacent channel interference.

At step 408, in some embodiments, cycles may be used to use active radios to obtain additional samples. In some embodiments, the samples may be used to compute adjustments to the prior-determined coefficients. In some embodiments, samples may be obtained and new coefficients may be calculated with respect to the model.

At step 410, the coefficients from step 408 may be applied to the polynomial model to generate a cancellation signal, which may be multiplied with the transceiver signal prior to transmission to cancel adjacent channel interference, after which the signal may be transmitted. At step 412, operation may return to a monitoring mode, which may at intervals or as needed return control to step 406.

The method shown in FIG. 4 may be applied to a single channel based on interference generated outside of a transmitting base station, or to multiple channels outside of the base station. The method may also be applied to multiple channels in the same base station. When applied to channels in the same base station, the generated transmission signal may be output both to an antenna and to an interference cancellation module, as shown above in FIG. 3. When applied to channels in the same base station, radio resources need not be used to monitor adjacent channel transmissions, as the generated signal is directly coupled to the adjacent channel's ACI module. Interference cancellation may proceed without checking for available radio resources as specified in step 408.

Figure 5:
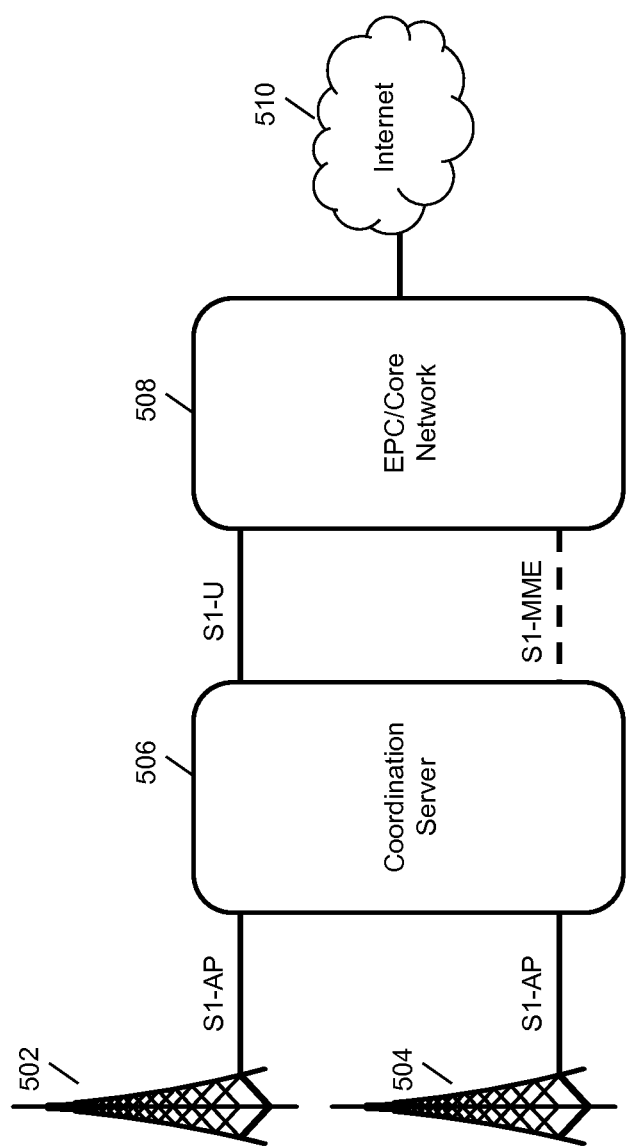
FIG. 5 is a schematic network diagram, in accordance with some embodiments.

FIG. 5 is a schematic diagram of a network architecture for providing prediction capabilities, in accordance with some embodiments. Base stations 502 and 504 are connected via an S1-AP interface to coordination server 506. Base stations 502 and 504 are eNodeBs, in some embodiments. Base stations 502 and 504 may host transceivers as described above, in some embodiments. Coordination server 506 is connected to the evolved packet core (EPC)/Core Network 508 via an S1 protocol connection and an S1-MME protocol connection. Coordination of base stations 502 and 504 may be performed at the coordination server, which may be the cloud coordination server described above, in some embodiments. In some embodiments, the coordination server may be located within the EPC/Core Network 508. EPC/Core Network 508 provides various LTE core network functions, such as authentication, data routing, charging, and other functions. In some embodiments, mobility management is performed both by coordination server 506 and within the EPC/Core Network 508. EPC/Core Network 508 provides, typically through a PGW functionality, a connection to the public Internet 510.

In some embodiments, coordination server 506 may provide compute power for computing the adjacent channel interference signal component coefficients, as described above. Coordination server 506 may take into account samples or sample information received from base station 502, in some embodiments. Coordination server 506 may also take into account samples or sample information received from base station 504, in some embodiments. Coordination server 506 may also take into account other factors, such as weather, climate, prior heuristic outcomes, prior coefficients/weights, other transmissions known to the coordination server, pre-planned or pre-provisioned transmissions or sources of interference, historical transmissions, historical coefficients, historical interference sources, or other sources.

A neural network may be used to perform these computations at coordination server 506, in some embodiments. The neural network may be a feedforward neural network, a supervised neural network with prior supervision, a device using a neuromorphic hardware chip, a convolutional neural network, a recurrent neural network, a probabilistic neural network, or another type of neural network.

Figure 6:
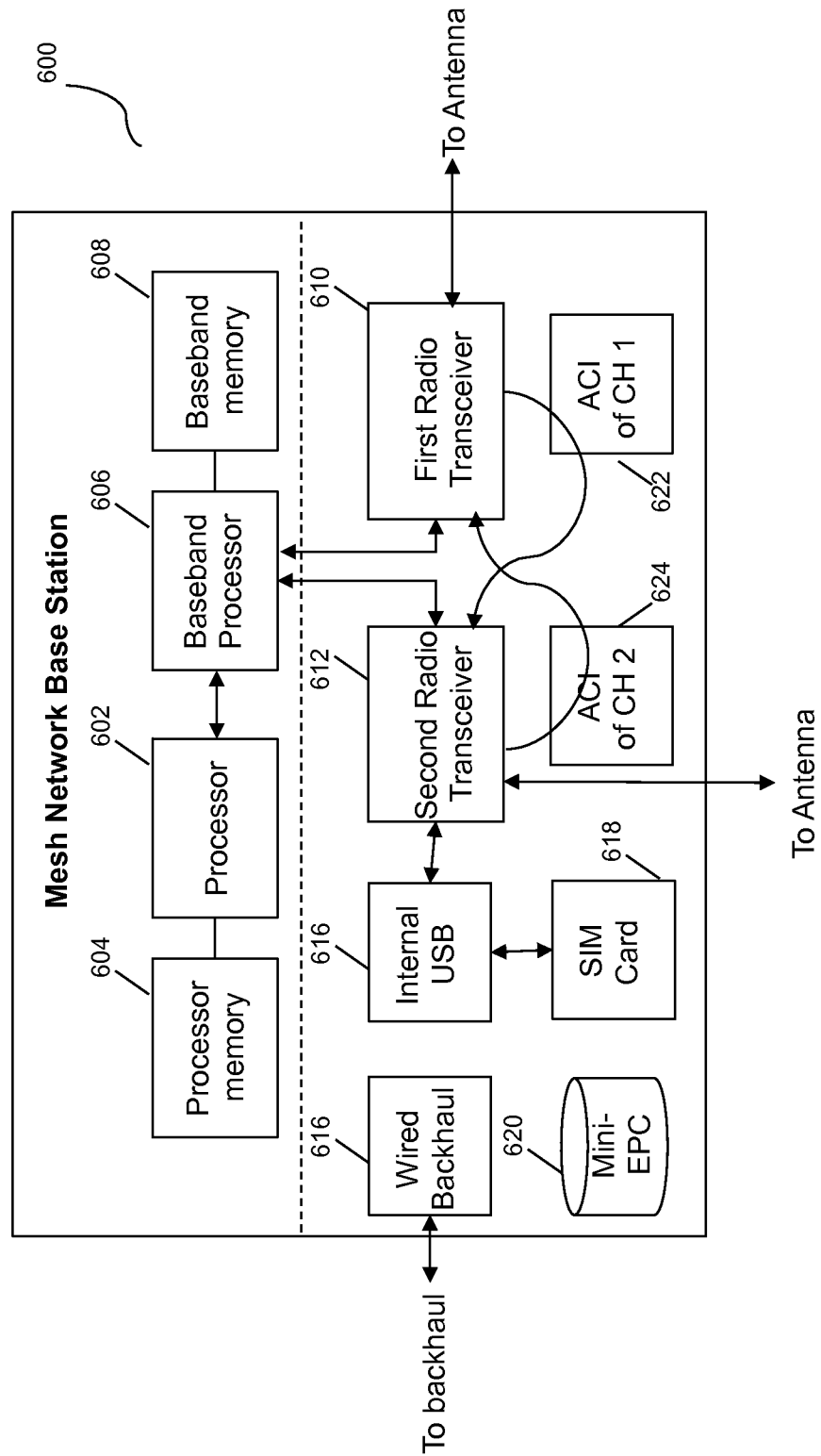
FIG. 6 is a schematic diagram of an exemplary device for performing an adjacent channel interference cancellation method, in accordance with some embodiments.

A physical device for use with the methods described herein is disclosed in connection with FIG. 6.

FIG. 6 depicts a block diagram of an exemplary base station, in accordance with some embodiments. Mesh network base station 600 may include processor 602, processor memory 604 in communication with the processor, baseband processor 606, and baseband processor memory 608 in communication with the baseband processor. Base station 600 may also include first radio transceiver 610 and second radio transceiver 612, internal universal serial bus (USB) port 614, and wired backhaul connection 616. A subscriber information module card (SIM card) 618 may be coupled to USB port 614. In some embodiments, the second radio transceiver 612 itself may be coupled to USB port 614, and communications from the baseband processor may be passed through USB port 614. A mini-evolved packet core (EPC) module 620 may also be included for authenticating users and performing other EPC-dependent functions when no backhaul link is available at all.

First radio transceiver 610 may be coupled to second radio transceiver 612 via first adjacent channel interference cancellation module 622, for canceling the interference caused by transceiver 610 to the signal of transceiver 612. Second radio transceiver 612 may be coupled to first radio transceiver 610 via second adjacent channel interference cancellation module 624. The output of each channel is thus used in canceling interference caused to the adjacent channel's transmission.

Processor 602 and baseband processor 606 are in communication with one another. Processor 602 may perform routing functions, and may determine if/when a switch in network configuration is needed. Baseband processor 606 may generate and receive radio signals for both radio transceivers 610 and 612, based on instructions from processor 602. In some embodiments, processors 602 and 606 may be on the same physical logic board. In other embodiments, they may be on separate logic boards.

The first radio transceiver 610 may be a radio transceiver capable of providing LTE eNodeB functionality, and may be capable of higher power and multi-channel OFDMA. The second radio transceiver 612 may be a radio transceiver capable of providing LTE UE functionality. Both transceivers 610 and 612 are capable of receiving and transmitting on one or more LTE bands. In some embodiments, either or both of transceivers 610 and 612 may be capable of providing both LTE eNodeB and LTE UE functionality. Transceiver 610 may be coupled to processor 602 via a Peripheral Component Interconnect-Express (PCI-E) bus, and/or via a daughtercard. As transceiver 612 is for providing LTE UE functionality, in effect emulating a user equipment, it may be connected via the same or different PCI-E bus, or by a USB bus, and may also be coupled to SIM card 618.

SIM card 618 may provide information required for authenticating the simulated UE to the evolved packet core (EPC). When no access to an EPC is available, a mini-EPC (EPC) within device 600 may be used, or a mini-EPC located within the confines of the mesh network. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul 616 may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 610 and 612, which may be Wi-Fi 802.11a/b/g/n/ac, Bluetooth, ZigBee, microwave (including line-of-sight microwave), or another wireless backhaul connection. Any of the wired and wireless connections may be used for either access or backhaul, according to identified network conditions and needs, and may be under the control of processor 602 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 610 and 612. Baseband processor 606 may use memory 608 to perform these tasks.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to Wi-Fi networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method for a base station to perform adjacent channel interference cancellation with multiple co-located transmit channels and multiple co-located receive channels, comprising:

determining, at a cloud coordination server, that a first transmit channel transceiver of the base station is scheduled to transmit when a second transmit channel transceiver of the base station is scheduled to receive, and initiating sending an interference cancellation procedure message based on said determination;

collecting, at the base station, a first channel usage sample at a first transmit time and at the first transmit channel transceiver using a first transmit channel;

collecting, at the base station, a second channel usage sample at the first transmit time and at the second transmit channel transceiver colocated with the first transmit channel transceiver-and using a second transmit channel;

sending the first channel usage sample and the second usage sample to the cloud coordination server for analysis using a low-latency connection;

assigning, by the cloud coordination server, coefficient weights in an adjacent channel interference model for each of the first and the second transmit channel based on the first and the second channel usage samples;

determining, at the base station, whether a radio is available for measuring current adjacent channel usage;

dynamically adjusting, by the cloud coordination server, coefficient weights for the first transmit channel based on the current adjacent channel usage; and adding, at the base station, a correction signal canceling noise in a second receive channel at a second time based on the coefficient weights for the first transmit channel, wherein the second transmit channel is adjacent to the first transmit channel, such that the second transmit channel shares an upper or a lower frequency boundary with a frequency band of the first transmit channel.

2. The method of claim 1, wherein canceling interference is performed in a digital domain and in an analog domain.

3. The method of claim 1, wherein the first time is more than 5 milliseconds prior to the second time.

4. The method of claim 1, further comprising determining whether the radio is available for measuring current adjacent channel usage based on an unused time slot in a time division duplexing scheme.

5. The method of claim 1, wherein the first and the second transmit channel are configured for use with a non-simultaneous access protocol.

6. The method of claim 1, wherein either the first or the second transmit channel is configured for use with a radio access technology that does not transmit cell-specific training signals.

7. The method of claim 1, wherein either the first or the second transmit channel is configured for use with Wi-Fi.

8. The method of claim 1, further comprising using unique pilots/preambles, a time division duplexing method, or a frequency division duplexing method wherein frame staggering is applied to the start time of frames.

9. The method of claim 1, further comprising performing, at the cloud coordination server, analysis of samples received from a plurality of transceivers.

10. The method of claim 1, further comprising assigning the coefficient weights at the base station, and dynamically adjusting the coefficient weights at the base station.

11. A multi-radio access technology (multi-RAT) base station, comprising:
 a memory configured to store instructions;
 a first transmit channel transceiver, the first transmit channel transceiver being configurable for receiving radio transmissions on a plurality of frequencies and for obtaining an adjacent channel interference signal sample;
 a second transmit channel transceiver;
 a network interface in communication with a cloud communication server, the cloud communication server configured to determine that the first transmit channel transceiver is scheduled to transmit when the second transmit channel transceiver is scheduled to receive, and configured to send an interference cancellation procedure message to the network interface based on said determination; and
 a processor coupled to the memory, the first transmit channel transceiver, the second transmit channel transceiver, and a radio frequency chain configured to compute an adjacent channel interference cancellation signal based on the adjacent channel interference signal sample by:
 collecting a first channel usage sample at a first transmit time and at the first transmit channel transceiver using a first transmit channel;
 collecting a second channel usage sample at the first transmit time and at the second transmit channel transceiver using a second transmit channel;
 sending the first channel usage sample and the second channel usage sample to the cloud coordination server for analysis using a low-latency connection;
 receiving, from the cloud coordination server, coefficient weights in an adjacent channel interference model for each of the first and the second transmit channel based on the first and the second channel usage samples;
 determining whether a radio is available for measuring current adjacent channel usage;
 receiving, from the cloud coordination server, dynamically adjusted coefficient weights for the first transmit channel based on the current adjacent channel usage; and
 adding a correction signal for canceling noise in a second receive channel at a second time based on the coefficient weights for the first transmit channel,
 wherein the second transmit channel is adjacent to the first transmit channel, such that the second transmit channel is located immediately on either side of a frequency band of the first transmit channel.

12. The multi-RAT base station of claim 11, further comprising the radio frequency chain coupled to an output of the first transmit channel transceiver and configured to sample adjacent channel interference caused by the first transmit channel transceiver.

13. The multi-RAT base station of claim 12, wherein the radio frequency chain is configured to perform noise cancellation in an analog domain.

14. The multi-RAT base station of claim 11, further comprising a storage module for storing adjacent channel samples, and the processor further configured to precompute a plurality of coefficients for multiplying the adjacent channel interference cancellation signal based on the stored adjacent channel samples.

15. The multi-RAT base station of claim 11, wherein the radio transceiver is a software-defined radio.

16. A system for canceling adjacent channel interference, comprising:
 a multi-radio access technology (multi-RAT) base station, the multi-RAT base station further comprising:
 a memory configured to store instructions,
 a first transmit channel transceiver, the first transmit channel transceiver configured to receive radio transmissions on a first transmission channel and to obtain a sample of an adjacent channel interference signal,
 a second transmit channel transceiver, the second transmit channel transceiver configured to receive radio transmissions on a second transmission channel, and
 a processor coupled to the memory, the first transmit channel transceiver, and the second transmit channel transceiver, and configured to:
 send a first channel usage sample and a second channel usage sample to a cloud coordination server for analysis using a low-latency connection, and
 add a correction signal for canceling noise in the second transmission channel based on coefficient weights received from the cloud coordination server for the first transmission channel,
 thereby computing an adjacent channel interference cancellation signal based on the sample of the adjacent channel interference signal; and
 the cloud coordination server, the cloud coordination server further comprising:
 a processor in communication with the multi-RAT base station for determining that a first transmit channel transceiver of the multi-RAT base station is scheduled to transmit when a second transmit channel transceiver of the multi-RAT base station is scheduled to receive, and for sending an interference cancellation procedure message to the multi-RAT base station based on said determination; and
 an interference cancellation module configured to:
 receive the sample of the adjacent channel interference signal from the multi-RAT base station,
 assign coefficient weights in the adjacent channel interference signal, and
 dynamically adjust the coefficient weights for the first transmission channel based on a current adjacent channel usage, wherein the adjacent channel interference signal is in a channel that is adjacent to the first transmission channel, such that the adjacent channel interference signal is in a channel located immediately on either side of a frequency band of the first transmission channel.

17. The system of claim 16, wherein the interference cancellation module is configured to use a neural network to determine the coefficient weights.

18. The system of claim 16, wherein the interference cancellation module is configured to use samples from more than one multi-RAT base station to determine the coefficient weights.

19. The system of claim 16, wherein the multi-RAT base station is configured to receive the determined coefficient weights from the coordination server and is configured to apply the adjacent channel interference cancellation signal based on the determined coefficient weights.

\* \* \* \* \*